(12) United States Patent
Zhang et al.

(10) Patent No.: US 12,435,776 B2
(45) Date of Patent: Oct. 7, 2025

(54) ELECTRIC CABLE DRIVING MECHANISM HAVING SELF-RETURN FUNCTION

(71) Applicant: KEIPER SEATING MECHANISMS CO., LTD., Shanghai (CN)

(72) Inventors: Zhihui Zhang, Shanghai (CN); Jinghui Chen, Shanghai (CN); Yutong Guo, Shanghai (CN); Jiahao Shen, Shanghai (CN); Peina Lian, Shanghai (CN); Qi Wang, Shanghai (CN); Jian Chang, Shanghai (CN)

(73) Assignee: KEIPER SEATING MECHANISMS CO., LTD., Shanghai (CN)

( * ) Notice: Subject to any disclaimer, the term of this patent is extended or adjusted under 35 U.S.C. 154(b) by 191 days.

(21) Appl. No.: 18/395,608

(22) Filed: Dec. 24, 2023

(65) Prior Publication Data

US 2024/0133453 A1 Apr. 25, 2024
US 2024/0229906 A9 Jul. 11, 2024

Related U.S. Application Data

(63) Continuation of application No. PCT/CN2022/099725, filed on Jun. 20, 2022.

(30) Foreign Application Priority Data

Jun. 25, 2021 (CN) .......................... 202110715889.1
Jun. 25, 2021 (CN) .......................... 202121426492.2

(51) Int. Cl.
*F16H 25/24* (2006.01)
*H02K 7/06* (2006.01)

(52) U.S. Cl.
CPC ............... *F16H 25/24* (2013.01); *H02K 7/06* (2013.01)

(58) Field of Classification Search
CPC .................................. F16H 25/24; H02K 7/06
See application file for complete search history.

(56) References Cited

U.S. PATENT DOCUMENTS

| 6,109,124 A | 8/2000 | Chen |
| 6,269,926 B1 * | 8/2001 | Lemoine ............... B60T 13/745 |
| | | 192/30 W |

(Continued)

FOREIGN PATENT DOCUMENTS

| CN | 101042176 | 9/2007 |
| CN | 110154839 | 8/2019 |

(Continued)

OTHER PUBLICATIONS

"International Search Report (Form PCT/ISA/210) of PCT/CN2022/099725," mailed on Aug. 29, 2022, with English translation thereof, pp. 1-4.

(Continued)

*Primary Examiner* — Zoheb S Imtiaz
(74) *Attorney, Agent, or Firm* — JCIPRNET (57) ABSTRACT

Provided is an electric cable driving mechanism having a self-return function. The electric cable driving mechanism includes a housing assembly, an electric motor, a three-stage transmission mechanism and a multifunctional nut, the three-stage transmission mechanism includes a coil spring assembly, the electric motor is fixed to the housing assembly, and the three-stage transmission mechanism and the multifunctional nut are mounted in the housing assembly; and the multifunctional nut includes two cable mounting grooves and is in transmission connection to the electric motor by means of the three-stage transmission mechanism. According to the electric cable driving mechanism having a self-return function of the present disclosure, the three-stage transmission mechanism is used, and outputs a larger force compared with two-stage transmission; and a split multi- (Continued)

functional screw rod is easy to mount, such that mounting of a coil spring during assembly is prevented from scratching the screw rod.

10 Claims, 5 Drawing Sheets

(56) References Cited

U.S. PATENT DOCUMENTS

2015/0240924 A1* 8/2015 Lee .................... F16H 25/24
                                                    74/89.36
2018/0266530 A1   9/2018 Alfano et al.
2023/0407953 A1* 12/2023 Song .................... H02K 7/06

FOREIGN PATENT DOCUMENTS

| CN | 111532184 | 8/2020 |
| CN | 113357335 | 9/2021 |

OTHER PUBLICATIONS

"Written Opinion of the International Searching Authority (Form PCT/ISA/237) of PCT/CN2022/099725" mailed on Aug. 29, 2022, pp. 1-5.

\* cited by examiner

ELECTRIC CABLE DRIVING MECHANISM HAVING SELF-RETURN FUNCTION

CROSS-REFERENCE TO RELATED APPLICATION

This application is a continuation of international PCT application serial no. PCT/CN2022/099725, filed on Jun. 20, 2022, which claims the priority benefit of China applications serial no. 202121426492.2 and 202110715889.1, filed on Jun. 25, 2021. The entirety of each of the above-mentioned patent applications is hereby incorporated by reference herein and made a part of this specification.

TECHNICAL FIELD

The present disclosure relates to the field of electric cable driving mechanisms, and in particular to an electric cable driving mechanism having a self-return function.

RELATED ART

An electric motor-driven two-stage transmission system, a commonly used transmission form, is used in an existing electric cable driving mechanism at present, and consists of transmission of a first-stage gear and a first-stage screw rod nut; in this case, the first-stage gear and the first-stage screw rod nut can be manufactured through different processes, such as (1) an integrated injection molded plastic member; and (2) a screw rod made of metal and circumferentially wrapped with a plastic gear; and two-stage transmission usually outputs a small force, and if a larger output force is required, strength is usually insufficient in this way. With a limitation of spatial arrangement, a coil spring needs to axially pass through a long screw rod when being mounted into the integrated screw rod, which may scratch the screw rod, resulting in abnormal noise.

SUMMARY OF INVENTION

Technical Problem

Aiming at the defects in the prior art, the present disclosure provides an electric cable driving mechanism having a self-return function. The three-stage transmission mechanism is used, and outputs a larger force compared with two-stage transmission; and a split multifunctional screw rod is easy to mount such that mounting of a coil spring during assembly can be prevented from scratching the screw rod, and the problem of abnormal noise generated during mounting of the coil spring is solved.

Solution to Problem

In order to achieve the above objective, the present disclosure provides an electric cable driving mechanism having a self-return function. The electric cable driving mechanism includes a housing assembly, an electric motor, a three-stage transmission mechanism and a multifunctional nut, the three-stage transmission mechanism includes a coil spring assembly, the electric motor is fixed to the housing assembly, and the three-stage transmission mechanism and the multifunctional nut are mounted in the housing assembly; and the multifunctional nut includes two cable mounting grooves and is in transmission connection to the electric motor by means of the three-stage transmission mechanism.

Preferably, the three-stage transmission mechanism includes a multifunctional screw rod, the coil spring assembly and a three-stage gear, the multifunctional screw rod includes a spline and an external thread section, a shaft shoulder is formed at each of two ends of the multifunctional screw rod, a U-shaped groove matching the shaft shoulder is formed in the housing assembly, and a recess is formed at an outer side of the spline; the coil spring assembly and the three-stage gear sleeve the spline, a connecting portion matching the spline is formed inside the three-stage gear, the three-stage gear sleeves the spline by means of the connecting portion, and a convex rib matching the recess is formed at an outer side end of the three-stage gear; and the coil spring assembly includes a coil spring and a cover, an inner side end of the coil spring matches the spline for limiting, and an outer side end of the coil spring is connected to the cover.

Preferably, the coil spring assembly is arranged between the three-stage gear and the external thread section, and alternatively, the coil spring assembly, the three-stage gear and the external thread section are sequentially arranged.

Preferably, the three-stage transmission mechanism further includes an input gear and a duplex gear, the input gear is connected to an output shaft of the electric motor, and the duplex gear is in transmission connection to the input gear; and the three-stage gear is in transmission connection to the duplex gear.

Preferably, the multifunctional nut includes a non-self-locking internal threaded hole, several guide strips, two limited planes and the cable mounting groove, the non-self-locking internal threaded hole is formed in a middle of the multifunctional nut and is screwed onto the external thread section of the multifunctional screw rod by means of the non-self-locking internal threaded hole; the guide strips are formed on an upper surface and a lower surface of the multifunctional nut and extend in an axial direction of the non-self-locking internal threaded hole, and a guide groove matching the guide strip is formed in the housing assembly; and the limited plane is formed at each of a top surface and a bottom surface of the multifunctional nut, and the housing assembly limits the limited plane.

Preferably, the cable mounting grooves are formed at two sides of the multifunctional nut, and the cable mounting groove includes a structure for preventing a cable head from slipping out.

Preferably, the cable mounting groove includes an outer-side section and an inner-side section, a width of the outer-side section is less than a width of the inner-side section.

Preferably, two bosses are formed on side walls of two ends of the non-self-locking internal threaded hole of the multifunctional nut respectively, and a rubber pad sleeves the boss.

Preferably, the electric cable driving mechanism further includes a rubber sleeve, the rubber sleeve sleeves the multifunctional nut.

Preferably, the electric cable driving mechanism further includes a connector and a connecting terminal, the housing assembly includes a cover plate and a box, the cover plate and the box match each other to form a connector mounting space and an electric motor mounting space; the connector is arranged in the connector mounting space, and the electric motor is arranged in the electric motor mounting space; a first end of the connecting terminal is buckled to the connector, and a bent portion is formed at a second end of the connecting terminal; and a positioning hole matching the bent portion is formed at an end portion of the electric motor, and the bent portion is inserted into the positioning hole.

Preferably, the housing assembly includes a cover plate and a box, an electric motor connecting port is formed on the box, and the electric motor is screwed to the electric motor connecting port.

Effects of Invention

The present disclosure has the following beneficial effects by using the above technical solution:
the three-stage transmission mechanism is used, and outputs a larger force compared with two-stage transmission; and different forces can be output by selecting motors having different powers but sharing a transmission member; a force output by the motor having larger torque through three-stage deceleration converted to the screw rod is larger; the split multifunctional screw rod is easy to mount, such that mounting of the coil spring during assembly is prevented from scratching the screw rod, and the problem of abnormal noise generated during mounting of the coil spring is solved; and electric motor power is different from a shape connecting interface, and the same transmission part is used, and two motors having different performance are selected to be adapted to different interfaces such that forces in two different segments can be output to achieve optimal solution of cost and performance. The multifunctional nut is provided with the structure for preventing the cable head from slipping out. The coil spring assembly reversely drives the multifunctional nut to automatically return to an initial position after motion system actions are completed; and the rubber pad can reduce impact noise between the multifunctional nut and the box when the multifunctional nut runs to a stop position.

DESCRIPTION OF EMBODIMENTS

The preferred examples of the present disclosure will be provided below according to FIGS. 1-8, and will be described in detail such that the functions and features of the present disclosure can be better understood.

With reference to FIGS. 1-7, an electric cable driving mechanism having a self-return function according to an example of the present disclosure includes a housing assembly 1, an electric motor 2, a three-stage transmission mechanism 3 and a multifunctional nut 4, the three-stage transmission mechanism 3 includes a coil spring assembly 32, the electric motor 2 is fixed to the housing assembly 1, and the three-stage transmission mechanism 3 and the multifunctional nut 4 are mounted in the housing assembly 1; and the multifunctional nut 4 includes two cable mounting grooves 41 and is in transmission connection to the electric motor 2 by means of the three-stage transmission mechanism 3.

Figure 1:
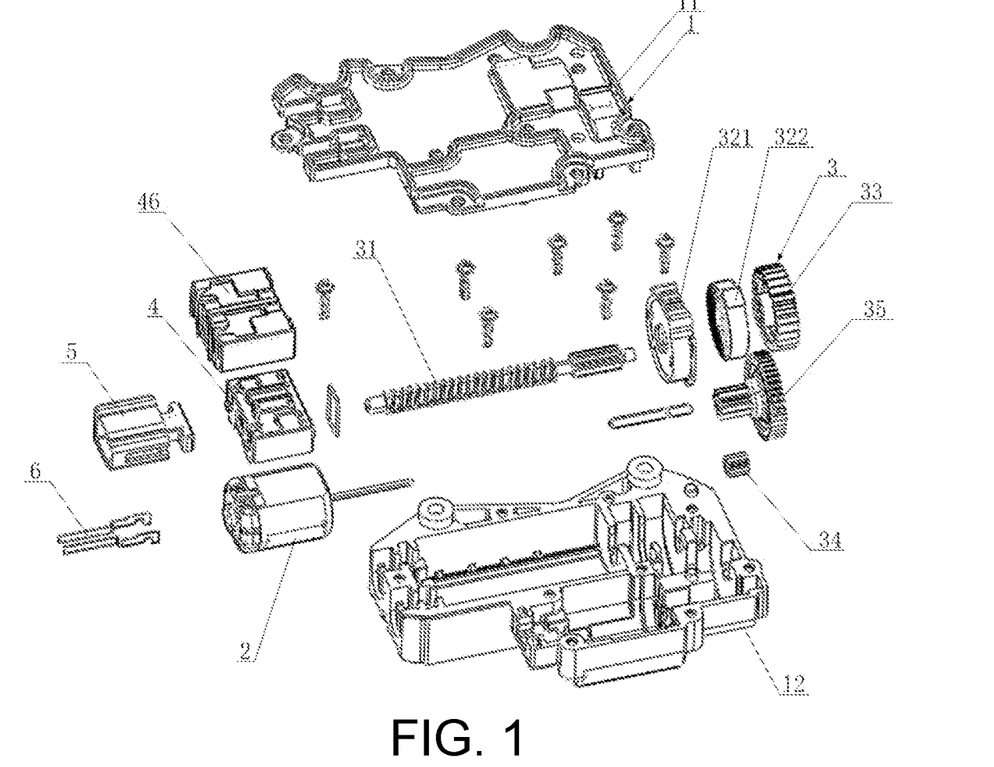
FIG. 1 is an exploded view of an electric cable driving mechanism having a self-return function according to Example 1 of the present disclosure.
Figure 2:
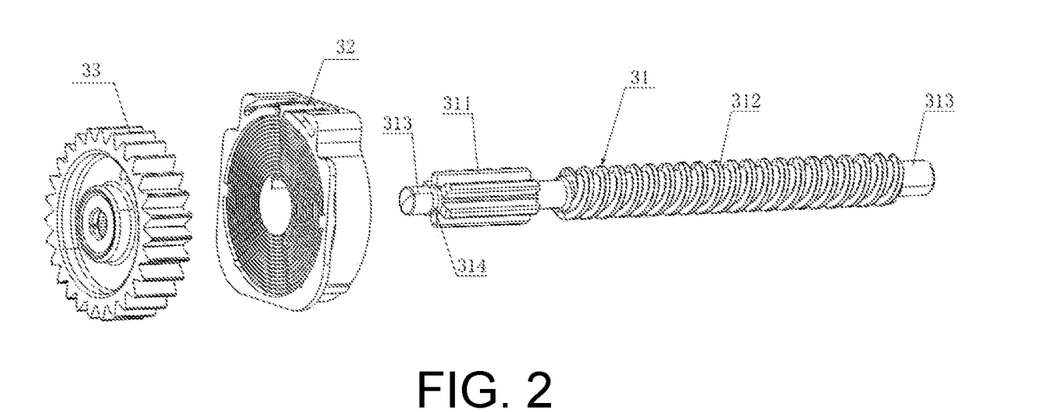
FIG. 2 is a schematic structural diagram of a multifunctional screw rod, a coil spring assembly and a three-stage gear according to Example 1 of the present disclosure.
Figure 3:
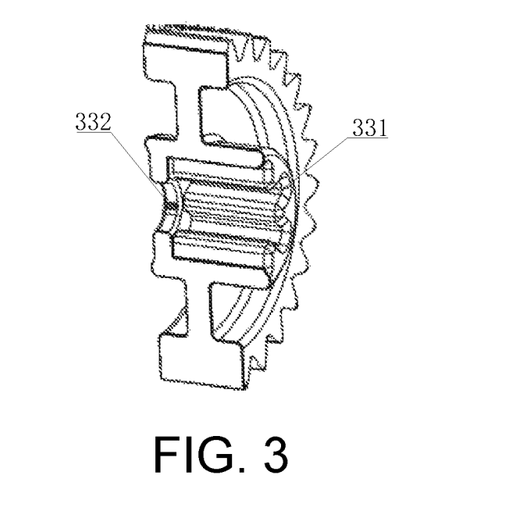
FIG. 3 is a sectional view of the three-stage gear according to Example 1 of the present disclosure.

With reference to FIGS. 1-3, the three-stage transmission mechanism 3 includes a multifunctional screw rod 31, the coil spring assembly 32 and a three-stage gear 33, the multifunctional screw rod 31 includes a spline 311 and an external thread section 312, a shaft shoulder 313 is formed at each of two ends of the multifunctional screw rod 31, a U-shaped groove matching the shaft shoulder 313 is formed in the housing assembly 1, and a recess 314 is formed at an outer side of the spline 311; the coil spring assembly 32 and the three-stage gear 33 sleeve the spline 311, a connecting portion 331 matching the spline 311 is formed inside the three-stage gear 33, the three-stage gear sleeves the spline 311 by means of the connecting portion 331, and a convex rib 332 matching the recess 314 is formed at an outer side end of the three-stage gear 33 to achieve axial limiting; and the coil spring assembly 32 includes a coil spring 321 and a cover 322, an inner side end of the coil spring 321 matches the spline 311 for limiting, and an outer side end of the coil spring 321 is connected to the cover 322 to drive and reversely drive torque of the coil spring 321.

As shown in FIG. 2, the coil spring assembly 32 is located between the three-stage gear 33 and the external thread section 312, and an assembly size of the solution is small; and positions of the coil spring assembly 32 and the three-stage gear 33 may also be exchanged to achieve functions of an assembly, but an overall size is enlarged.

Figure 5:
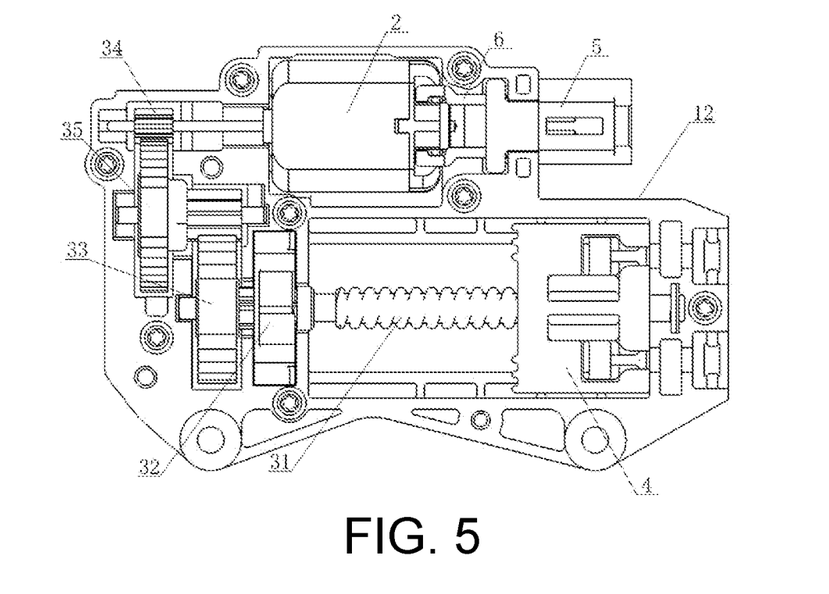
FIG. 5 is a first working condition diagram of Example 1 of the present disclosure.

With reference to FIGS. 1 and 5, the three-stage transmission mechanism 3 further includes an input gear 34 and a duplex gear 35, the input gear 34 is connected to an output shaft of the electric motor 2, and the duplex gear 35 is in transmission connection to the input gear 34; and the three-stage gear 33 is in transmission connection to the duplex gear 35.

Figure 9:
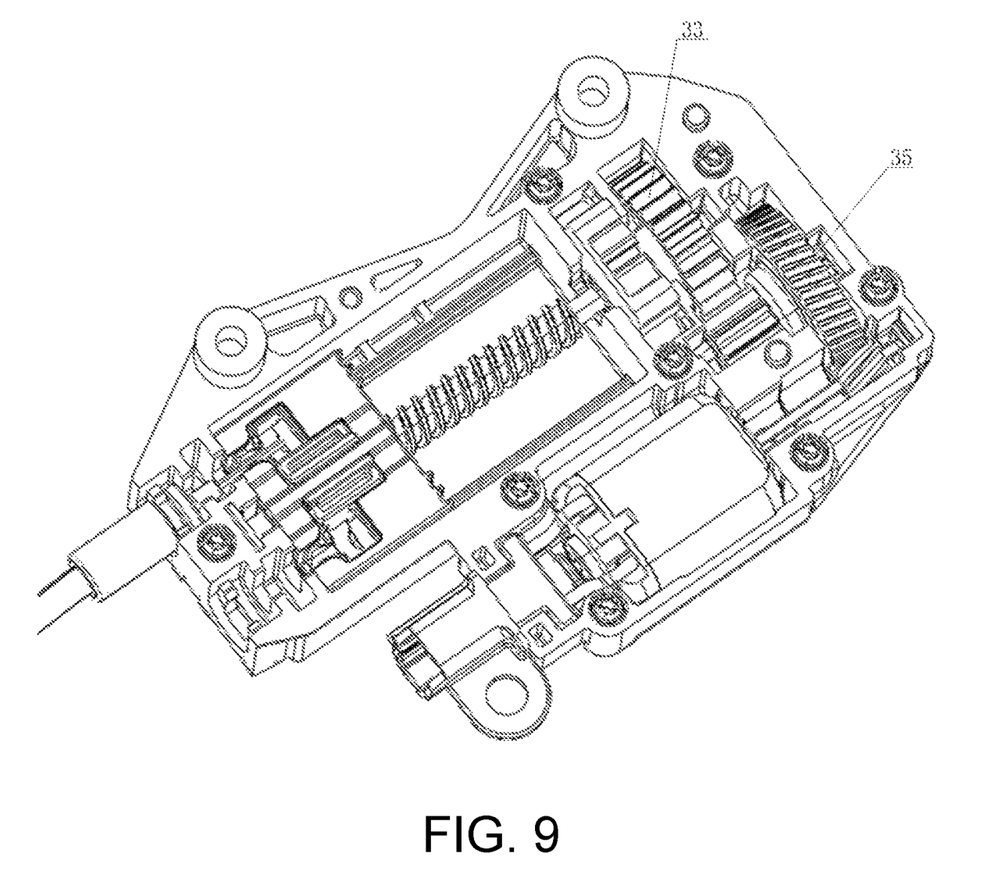
FIG. 9 is a schematic structural diagram when a helical gear is used in Example 1 of the present disclosure.

In FIG. 9, a duplex gear 35 is a helical gear structure, and moreover, a three-stage gear 33 may also be a helical gear.

Figure 4:
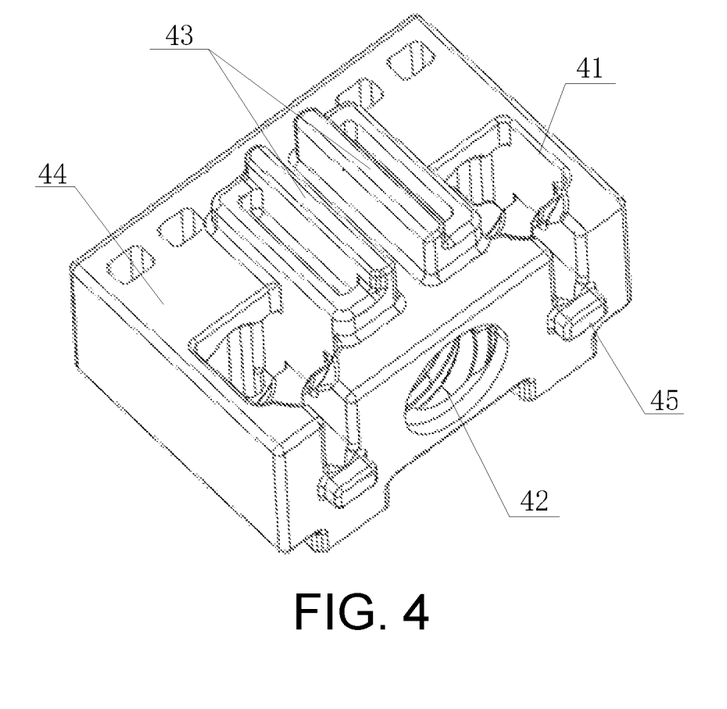
FIG. 4 is a schematic structural diagram of a multifunctional nut according to Example 1 of the present disclosure.

With reference to FIGS. 1 and 4, the multifunctional nut 4 includes a non-self-locking internal threaded hole 42, several guide strips 43, two limited planes 44 and the cable mounting groove 41, the non-self-locking internal threaded hole 42 is formed in a middle of the multifunctional nut 4 and is screwed onto the external thread section 312 of the multifunctional screw rod 31 by means of the non-self-locking internal threaded hole 42; the guide strips 43 are formed on an upper surface and a lower surface of the multifunctional nut 4 and extend in an axial direction of the non-self-locking internal threaded hole 42, and a guide groove matching the guide strip 43 is formed in the housing assembly 1; and the limited plane 44 is formed at each of a top surface and a bottom surface of the multifunctional nut 4, and the housing assembly 1 limits the limited plane 44.

The guide strip 43 matches the box 12 to prevent the multifunctional nut 4 from rotating around the multifunctional screw rod 31 (the screw rod 31 rotates) and to guide the multifunctional nut 4 to move axially along the multifunctional screw rod 31. The two limited planes 44 match the box 12 (and a box cover 11) to prevent the multifunctional nut 4 from moving in a height direction. Two different types of cable heads, such as a cuboid cable head and a cylindrical cable head, may be mounted in the two cable mounting grooves 41 by means of a size relation.

The cable mounting grooves 41 are formed at two sides of the multifunctional nut 4, and the cable mounting groove 41 includes a structure for preventing a cable head from slipping out. The cable mounting groove 41 includes an outer-side section and an inner-side section, a width of the outer-side section is less than a width of the inner-side section, so as to prevent a cable head mounted in the cable mounting groove 41 from slipping out.

During assembly, the cable head needs to be assembled at a certain angle relative to an xy plane; the multifunctional nut 4 displaces in the axial direction of the multifunctional screw rod 31 such that it may be ensured that the cable head may not be separated from the cable mounting groove 41 during normal operation; and the cable mounting groove 41 may be made into different shapes, such as a compatible rectangular cable head and a cylindrical cable head, and has strong adaptability.

Two bosses are formed on side walls of two ends of the non-self-locking internal threaded hole 42 of the multifunctional nut 4 respectively, and a rubber pad 45 sleeves the boss, and is configured to absorb energy and reduce noise.

The electric cable driving mechanism further includes a rubber sleeve 46, the rubber sleeve 46 sleeves the multifunctional nut 4.

With reference to FIGS. 1 and 5, the electric cable driving mechanism further includes a connector 5 and a connecting terminal 6, the housing assembly 1 includes a cover plate 11 and a box 12, the cover plate 11 and the box 12 match each other to form a connector mounting space and an electric motor mounting space; the connector 5 is arranged in the connector mounting space, and the electric motor 2 is arranged in the electric motor mounting space; a first end of the connecting terminal 6 is buckled to the connector 5, and a bent portion is formed at a second end of the connecting terminal 6; and a positioning hole matching the bent portion is formed at an end portion of the electric motor 2, and the bent portion is inserted into the positioning hole.

A low-torque motor having torque ranging from 0 Nm to 0.05 Nm is used as the electric motor 2 of the example. By way of example, the electric motor is not limited to the low-torque motor.

Figure 6:
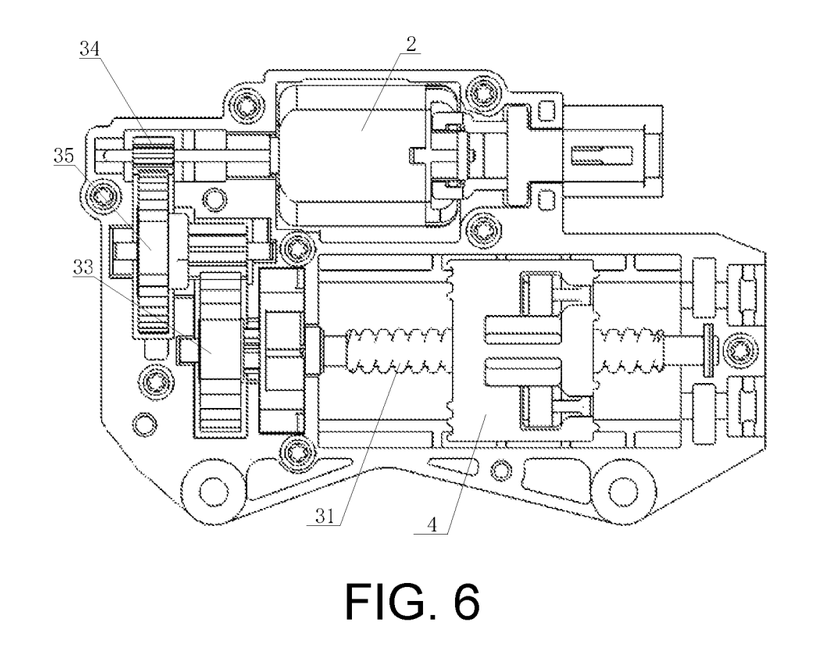
FIG. 6 is a second working condition diagram of Example 1 of the present disclosure.
Figure 7:
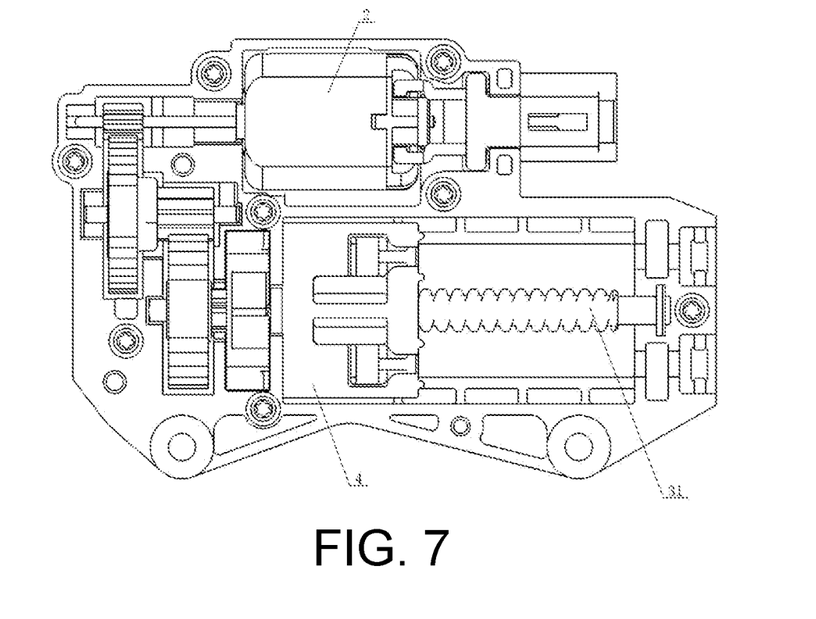
FIG. 7 is a third working condition diagram of Example 1 of the present disclosure.

A working process of an electric cable driving mechanism having a self-return function according to an example of the present disclosure is as follows:

with reference to FIGS. 1 and 5, an initial system state is as follows:

a coil spring 321 is pre-tightened for about one turn in an assembly, and an axial force generated by pre-tightening torque on a multifunctional screw rod 31 enables the multifunctional nut 4 always to be located at a farthest end, so as to prevent noise generated by an axial gap, and it may be ensured that the multifunctional nut 4 may return to the farthest end at any time when an electric motor 2 is energized, so as to prevent the mechanism from being externally unlocked;

with reference to FIGS. 1, 2 and 6, an energized state is as follows:

when the electric motor is energized, the electric motor 2 drives an input gear 34 to rotate counterclockwise, and a duplex gear 35 rotates clockwise to drive a three-stage gear 33 to rotate counterclockwise; and the multifunctional screw rod 31 rotates counterclockwise to drive an inner ring of the coil spring 321 to be tightened by means of a spline 311 at an end portion of the multifunctional screw rod 31, and simultaneously drive the multifunctional nut 4 to move forwards along a guide feature of a box 12, and in this case, the coil spring stores energy; and with reference to FIGS. 1 and 7, a limit position (energized) is as follows:

the electric motor 2 is energized to drive the multifunctional nut 4 to move to the limit position (the multifunctional nut 4 makes contact with a baffle of the box 12 to further compress a rubber sleeve 46), and the multifunctional nut may not continue moving leftwards; and the electric motor 2 stops rotating, and the coil spring 321 is tightened to a limit state; and the limit position (de-energized) is as follows:

after the electric motor 2 is de-energized, the coil spring 321 starts to release energy to reversely drive the multifunctional screw rod 31 to rotate clockwise, so as to further drive the multifunctional nut 4 assembly to move backwards along a guide groove of the box 12;

the multifunctional screw rod 31 drives the three-stage gear 33 to drive the duplex gear 35 to rotate counterclockwise; and the duplex gear 35 drives the input gear 34 to rotate clockwise.

(left-handed screw rod+counterclockwise electric motor is only schematic; and if a rotation direction of the screw rod is changed, such as right-handed screw rod+clockwise electric motor, an assembly function may also be achieved)

With reference to FIGS. 1 and 5, the coil spring 321 is reversely driven to the initial state:

after the electric motor 2 is de-energized, the coil spring 321 drives the multifunctional screw rod 31 to rotate reversely, the multifunctional nut 4 moves backwards along the guide groove of the box 12 to the baffle on a right side of the box 12 to compress the rubber sleeve 46 to a limit, and then the coil spring 321 stops releasing energy; and in this case, since the coil spring 321 still has the number of pre-tightening turns and the pre-tightening torque initially, the multifunctional nut 4 stops at a rightmost end of the box 12, and the system stops running.

Figure 8:
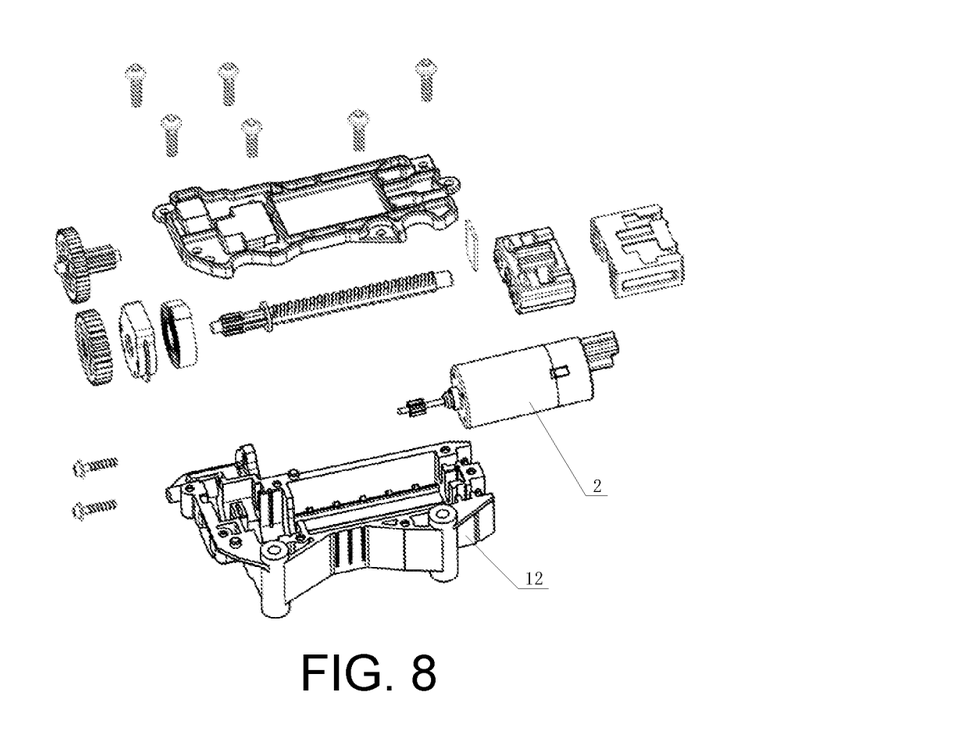
FIG. 8 is an exploded view of an electric cable driving mechanism having a self-return function according to Example 2 of the present disclosure.

With reference to FIG. 8, an electric cable driving mechanism having a self-return function according to an example of the present disclosure has basically the same structure as that of Example 1, but differs in that an electric motor connecting port is formed in a box 12, and an electric motor 2 is screwed onto the electric motor connecting port.

In the example, a high-torque motor having torque greater than 0.05 Nm is used as the electric motor. The electric motor is axially fixed on the box 12 by screws by means of two screw holes on an end surface. The mode can greatly reduce cost.

The present disclosure is described in detail above in combination with the accompanying embodiments and the examples, and those of ordinary skill in the art can make various variation examples to the present disclosure according to the above description. Therefore, certain details in the examples should not constitute limitations to the present disclosure, and the present disclosure uses the scope defined by the appended claims as the scope of protection of the present disclosure.

What is claimed is:

1. An electric cable driving mechanism having a self-return function, comprising a housing assembly, an electric motor, a three-stage transmission mechanism and a multifunctional nut, the three-stage transmission mechanism comprises a coil spring assembly, the electric motor is fixed to the housing assembly, and the three-stage transmission mechanism and the multifunctional nut are mounted in the housing assembly; and the multifunctional nut comprises two cable mounting grooves and is in transmission connection to the electric motor by means of the three-stage transmission mechanism, wherein the three-stage transmission mechanism comprises a multifunctional screw rod, and the multifunctional screw rod has an external thread section, wherein the multifunctional nut comprises a non-self-locking internal threaded hole, several guide strips, two limited planes and the cable mounting groove, the non-self-locking internal threaded hole is formed in a middle of the multifunctional nut and is screwed onto the external thread section of the multifunctional screw rod by means of the non-self-locking internal threaded hole; the guide strips are formed on an upper surface and a lower surface of the multifunctional nut and extend in an axial direction of the non-self-locking internal threaded hole, and a guide groove matching the guide strip is formed in the housing assembly; and the limited plane is formed at each of a top surface and a bottom surface of the multifunctional nut, and the housing assembly limits the limited plane.

2. The electric cable driving mechanism having a self-return function according to claim 1, wherein the three-stage transmission mechanism comprises the coil spring assembly and a three-stage gear, the multifunctional screw rod comprises a spline and a shaft shoulder is formed at each of two ends of the multifunctional screw rod, a U-shaped groove matching the shaft shoulder is formed in the housing assembly, and a recess is formed at an outer side of the spline; the coil spring assembly and the three-stage gear sleeve the spline, a connecting portion matching the spline is formed inside the three-stage gear, the three-stage gear sleeves the spline by means of the connecting portion, and a convex rib matching the recess is formed at an outer side end of the three-stage gear; and the coil spring assembly comprises a coil spring and a cover, an inner side end of the coil spring matches the spline for limiting, and an outer side end of the coil spring is connected to the cover.

3. The electric cable driving mechanism having a self-return function according to claim 2, wherein the coil spring assembly is arranged between the three-stage gear and the external thread section, and alternatively, the coil spring assembly, the three-stage gear and the external thread section are sequentially arranged.

4. The electric cable driving mechanism having a self-return function according to claim 2, wherein the three-stage transmission mechanism further comprises an input gear and a duplex gear, wherein the input gear is connected to an output shaft of the electric motor, and the duplex gear is in transmission connection to the input gear; and the three-stage gear is in transmission connection to the duplex gear.

5. The electric cable driving mechanism having a self-return function according to claim 4, wherein the cable mounting grooves are formed at two sides of the multifunctional nut, and the cable mounting groove comprises a structure for preventing a cable head from slipping out.

6. The electric cable driving mechanism having a self-return function according to claim 2, wherein the cable mounting groove comprises an outer-side section and an inner-side section, a width of the outer-side section is less than a width of the inner-side section.

7. The electric cable driving mechanism having a self-return function according to claim 5, wherein two bosses are formed on side walls of two ends of the non-self-locking internal threaded hole of the multifunctional nut respectively, and a rubber pad sleeves the boss.

8. The electric cable driving mechanism having a self-return function according to claim 7, further comprising a rubber sleeve, the rubber sleeve sleeves the multifunctional nut.

9. The electric cable driving mechanism having a self-return function according to claim 7, further comprising a connector and a connecting terminal, wherein the housing assembly comprises a cover plate and a box, wherein the cover plate and the box match each other to form a connector mounting space and an electric motor mounting space; the connector is arranged in the connector mounting space, and the electric motor is arranged in the electric motor mounting space; a first end of the connecting terminal is buckled to the connector, and a bent portion is formed at a second end of the connecting terminal; and a positioning hole matching the bent portion is formed at an end portion of the electric motor, and the bent portion is inserted into the positioning hole.

10. The electric cable driving mechanism having a self-return function according to claim 6, wherein the housing assembly comprises a cover plate and a box, an electric motor connecting port is formed on the box, and the electric motor is screwed to the electric motor connecting port.

* * * * *